US011196875B2

(12) United States Patent
Ishibashi

(10) Patent No.: US 11,196,875 B2
(45) Date of Patent: Dec. 7, 2021

(54) APPLICATION APPARATUS, IMAGE PROCESSING APPARATUS, AND NON-TRANSITORY COMPUTER READABLE MEDIUM WITH PLURALITY OF RECOVERY METHODS FOR APPLICATIONS SWITCHING TO BE IN OPERATION TARGET STATE

(71) Applicant: FUJIFILM BUSINESS INNOVATION CORP., Tokyo (JP)

(72) Inventor: Yuko Ishibashi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 736 days.

(21) Appl. No.: 15/912,910

(22) Filed: Mar. 6, 2018

(65) Prior Publication Data

US 2019/0089846 A1    Mar. 21, 2019

(30) Foreign Application Priority Data

Sep. 20, 2017 (JP) .............................. JP2017-180182

(51) Int. Cl.
*H04N 1/00*    (2006.01)
*G06F 3/12*    (2006.01)
(Continued)

(52) U.S. Cl.
CPC ....... *H04N 1/00066* (2013.01); *G06F 3/1207* (2013.01); *G06F 3/1224* (2013.01);
(Continued)

(58) Field of Classification Search
CPC ........ G06F 3/1225; G06F 3/123; G06F 3/121; G06F 3/1234; G06F 11/1402–1441;
(Continued)

(56) References Cited

U.S. PATENT DOCUMENTS 9,507,508 B2    11/2016  Park
9,727,230 B2    8/2017   Park
(Continued)

FOREIGN PATENT DOCUMENTS

JP    2006-252347 A    9/2006
JP    2013-519935 A    5/2013

OTHER PUBLICATIONS

Oct. 11, 2021 Office Action issued in Chinese Patent Application No. 201810435456.9.

*Primary Examiner* — Kent Yip
(74) *Attorney, Agent, or Firm* — Oliff PLC

(57) ABSTRACT

An application apparatus includes a removal controller, a selection controller, and a recovery controller. The removal controller performs, in a case where a removal event occurs, control for storing an operation state of an active application as an original operation state and removing the application from an operation target. The selection controller performs, before causing the removed application to be recovered as the operation target, control for allowing a user to select a specific recovery method from among plural recovery methods including a method for reproducing the original operation state. The recovery controller performs, in accordance with the selected specific recovery method, control for causing an operation of the removed application to be recovered.

16 Claims, 12 Drawing Sheets

(51) Int. Cl.
  *H04L 29/08* (2006.01)
  *H04L 12/24* (2006.01)
  *G06F 11/00* (2006.01)
  *G06F 9/00* (2006.01)
(52) U.S. Cl.
  CPC ........... *G06F 9/00* (2013.01); *G06F 11/00* (2013.01); *H04L 41/22* (2013.01); *H04L 67/142* (2013.01); *H04L 67/34* (2013.01); *H04N 1/00084* (2013.01); *H04N 1/00938* (2013.01); *H04N 1/00962* (2013.01)
(58) Field of Classification Search
  CPC ........... H04N 1/00938; H04N 1/00962; H04N 1/00084; H04N 1/32667
  See application file for complete search history.

(56) References Cited

U.S. PATENT DOCUMENTS

| | | | |
|---|---|---|---|
| 2006/0156157 A1* | 7/2006 | Haselden | G06F 11/0793 714/746 |
| 2010/0223498 A1* | 9/2010 | Schlesinger | G06F 11/1438 714/15 |
| 2012/0210321 A1* | 8/2012 | Silva | H04N 21/439 718/100 |

* cited by examiner

APPLICATION APPARATUS, IMAGE PROCESSING APPARATUS, AND NON-TRANSITORY COMPUTER READABLE MEDIUM WITH PLURALITY OF RECOVERY METHODS FOR APPLICATIONS SWITCHING TO BE IN OPERATION TARGET STATE

CROSS-REFERENCE TO RELATED APPLICATIONS

This application is based on and claims priority under 35 USC 119 from Japanese Patent Application No. 2017-180182 filed Sep. 20, 2017.

BACKGROUND

Technical Field

The present invention relates to an application apparatus, an image processing apparatus, and a non-transitory computer readable medium.

SUMMARY

According to an aspect of the invention, there is provided an application apparatus including a removal controller, a selection controller, and a recovery controller. The removal controller performs, in a case where a removal event occurs, control for storing an operation state of an active application as an original operation state and removing the application from an operation target. The selection controller performs, before causing the removed application to be recovered as the operation target, control for allowing a user to select a specific recovery method from among plural recovery methods including a method for reproducing the original operation state. The recovery controller performs, in accordance with the selected specific recovery method, control for causing an operation of the removed application to be recovered.

BRIEF DESCRIPTION OF THE DRAWINGS

Exemplary embodiments of the present invention will be described in detail based on the following figures, wherein.

DETAILED DESCRIPTION

Figure 1:
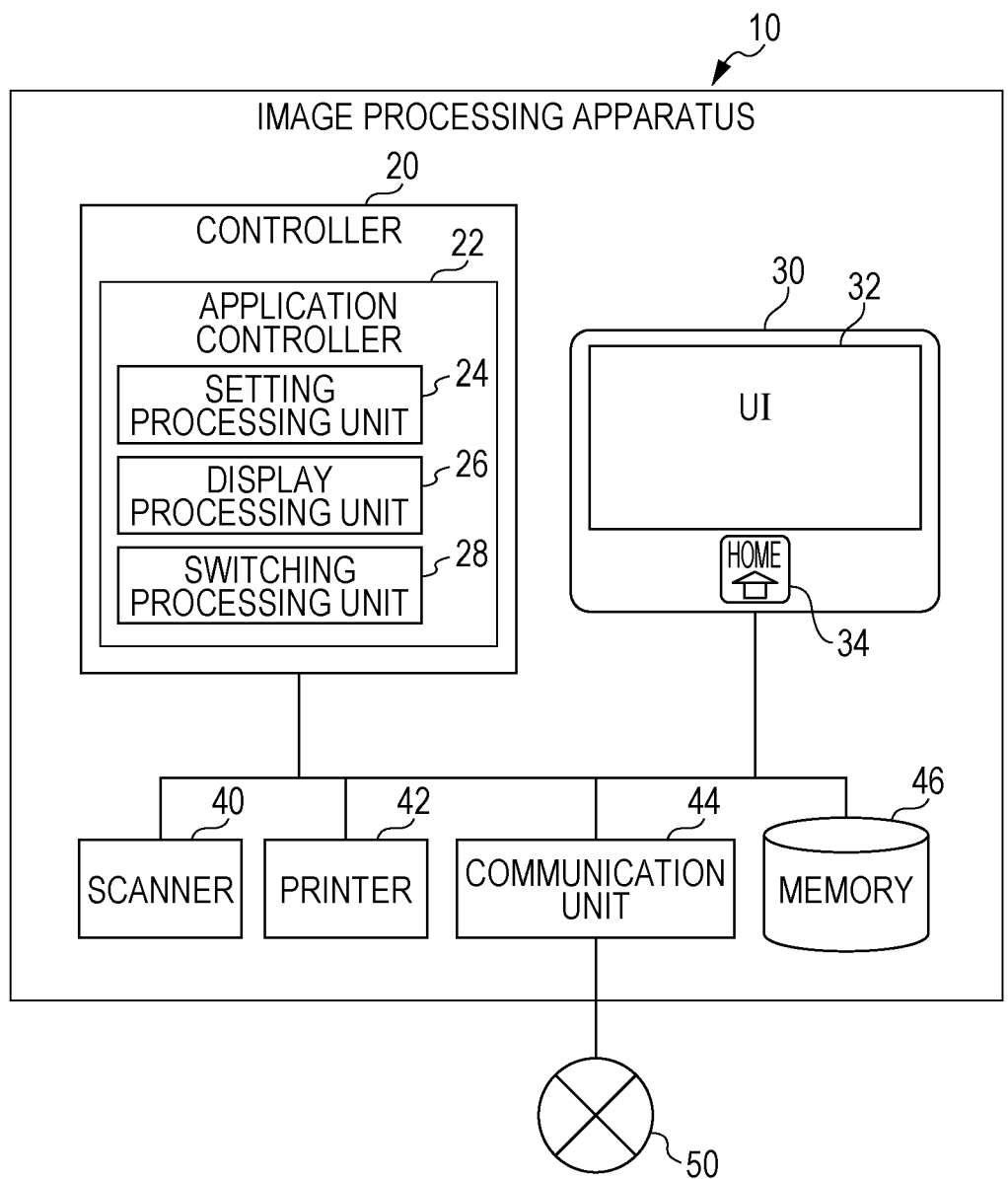
FIG. 1 is a diagram illustrating an example of a configuration of an image processing apparatus.

An image processing apparatus 10, which is an example of an application apparatus, will be explained below with reference to FIG. 1. FIG. 1 is a block diagram illustrating an example of a functional configuration of the image processing apparatus 10. The image processing apparatus 10 includes a controller 20, a user interface (UI) 30, a scanner 40, a printer 42, a communication unit 44, and a memory 46.

The controller 20 controls each unit of the image processing apparatus 10. Control by the controller 20 is implemented using information processing hardware such as a central processing unit (CPU) and a memory device and software such as an operation system (OS) and an application (may be abbreviated as an "app") operating on the hardware. An application controller 22 is provided at the controller 20. The application controller 22 performs control necessary for a case where applications are used in the image processing apparatus 10, such as startup of an installed application, various information processes based on an application, and termination of an application. The application controller 22 includes, as a configuration for the control, a setting processing unit 24, a display processing unit 26, and a switching processing unit 28.

In the case where setting for control of an operation of an application may be performed, the setting processing unit 24 performs processing for the setting. For example, an application may have setting values for processing of processing target data, such as setting parameters for size, image quality, and the like used in conversion processing of image data. Furthermore, an application may have setting values for controlling a control target such as setting parameters for printing paper and double-sided/single-sided printing for the case where the printer 42 is controlled. An application may have setting values for setting a user, an apparatus, a URL, and the like, such as an address and an output destination of images and data for the case where e-mail or facsimile transmission is performed. For the first startup of an application (that is, for startup of an application which was terminated previously and has yet to be started), a default value, which is a specific value, an indefinite value which is not defined, and the like are set as initial values. Setting values may be changed in accordance with a user operation. Furthermore, setting values may be changed to other values in accordance with a control rule of the image processing apparatus 10 instead of a user operation. The setting processing unit 24 manages initial values and change values for setting values and causes these values to be reflected in control of an application.

The display processing unit 26 performs processing for causing an image regarding an application to be displayed on the UI 30. Many applications are designed to display a screen for a user operation, a screen which displays an operation state, and the like on the UI 30, and the display processing unit 26 performs processing regarding the screen display mentioned above. Regarding display of a screen, when an application is started for the first time, an initial screen prepared in advance is normally displayed. An initial screen may include moving images as well as still images. Then, in accordance with a user operation or in accordance with a control rule which is not based on a user operation, display is changed from the initial screen. The display processing unit 26 performs management of an initial state and change state regarding the display as described above.

The switching processing unit 28 performs processing for switching between applications. The image processing apparatus 10 includes a function to switch between applications in accordance with a user operation on the UI 30 or in accordance with a control rule which is not based on a user operation. "Switching" mentioned herein represents switching which may be recognized by a user that switching between applications is performed and does not include switching in terms of internal information processing (processing such as time-sharing and multitask in which various programs using hardware resources are sequentially switched for a short period of time) which may not be normally recognized by a user. Switching is performed between a state in which an application is an operation target for a user and a state in which an application is not an operation target for a user. For switching, there is an issue of whether or not an application is an operation target for a user, but there is no issue of whether or not the state of internal processing is switched (for example, whether or not temporary stop processing is performed). A user performs an operation using the UI 30, and therefore, typically, switching is performed in conjunction with a screen displayed on the UI 30.

For example, a state in which a window of an application is displayed on the UI 30 so that a setting value may be changed or display of the window may be changed may be regarded as a state in which the application is an operation target for a user. In contrast, for example, in a case where a window of an application is switched to another window or a case where a desktop on which a window of an application is displayed is switched to another desktop, presence of a window of an application may not be recognized on display and the application may be removed from an operation target for a user. Furthermore, for example, in a case where part or the whole window of an application is hidden on the back side of another window or a case where a window of an application is closed and an icon is displayed, a specific operation may not be performed even though presence of an application may be recognized on display. The above explanation represents examples in which an application is removed from an operation target for a user. A case where an application is terminated is not represented by "removal". Termination represents a state in which an application is not yet started is recovered, for example, when a user explicitly terminates the application using an end button, when a user terminates the application by shutting down an apparatus, or when an apparatus state which is assumed to be shared with other people is reset after a certain period of time has passed. Removal represents a state in which an application is removed from an operation target for a user under a circumstance in which the above termination processing is not performed for the application and the user recognizes that continuity of the activation state of the application is secured.

The switching described above is performed when an event which triggers switching (this is an example of a removal event) occurs. An operation performed by a user on the UI 30 may be an example of an event. Examples of an event include an operation for switching a window of an application to different display, an operation for removing the window of the application from a display target by moving the window on the back side of a different window or representing the window as an icon. Furthermore, another example of an event which triggers switching may be a state in which an application stops specific processing. States in which an application stops specific processing may include a state in which a user explicitly switches between applications as described above and a state in which information processing (a unit of such processing is called a job) such as e-mail transmission, printing, scanning, and image conversion is performed (a case where a job start button is pressed, a job is completed, a job completion report is output, etc.) using a user operation result in an active application. Even in the case where a user does not explicitly switch between applications, if processing of the application stops, a user operation may not be required later. Therefore, stopping may be regarded as an event which triggers switching, and switching between operation targets may be performed.

In the case where switching is performed, the switching processing unit 28 performs, in conjunction with the setting processing unit 24 and the display processing unit 26, processing for causing the memory 46 to store an original setting value and display state at the time of switching of an application which is not operated after the switching (this is an example of control by a removal controller). To cause the application to be recovered as an operation target for a user, the switching processing unit 28 allows the user to select a state in which the application is to be recovered (this is an example of control by a selection controller). "Recovery" mentioned herein represents causing an application which is not terminated but is not an operation target to be returned as an operation target and does not include a state in which a non-active application is newly started. For recovery of an application, a user may perform the same operation as that performed at the time of first startup, such as pressing the same icon as that pressed at the time of the first startup. Furthermore, in an instruction manual of an apparatus, such an operation may be called a restart or the like and the name of such an operation may not be clearly distinguished from the name of the first startup. However, recovery maintains certain continuity from a point in time when the application is removed from the operation target and is to be distinguished from the first startup. The switching processing unit 28 causes the application to be recovered as an operation target for a user, in accordance with a result of selection by the user (this is an example of control by a recovery controller).

Options which may be selected by a user include, for example, an option for restoring a state at a switching time (a state immediately before the last switching from a state in which an application is an operation target to a state in which the application is not an operation target) and an option for recovering the application in an initial state. The state at the switching time may be completely restored or one or both of a setting value and a display state may be restored. For example, a case where a setting value set by a user is restored but a change in display other than the setting value is set to an initial state may be considered. Furthermore, only part of a setting value set by a user may be restored and the other part may not be restored (set to an initial state), in accordance with a predetermined condition. Two examples of the predetermined condition will be described below. The first example of the predetermined condition is that in a case where an operation for setting a setting value or the like is performed on another screen prior to restoration, a setting value which is consistent with the operation is restored but a setting value which is not consistent with the operation is not restored. Consistency represents a state in which an application operates normally without contradiction in accordance with a setting value. As a specific example, a case where setting for printing image data with no magnification (this is in the initial state) on paper of B4 size (an initial value is set to A4 size) is originally performed on a setting screen for an application for printing, the application is removed from an operation target, another application creates image data of A3 size, and then the original setting screen for the printing is restored, will be considered. In this example, all the image data may not be printed unless either a setting value for paper size (A4 size) or a setting value for magnification (no magnification) is changed. Thus, a setting value for a paper size set by a user is returned to the initial state. If there is no consistency between plural setting values (for example, a setting value for a paper size and a setting value for magnification), a setting value to be restored and a setting value to be returned to an initial state may be decided in accordance with a predetermined priority or all the setting values that have no consistency may be returned to an initial state. As in this example, in the case where plural applications are conjunction with each other, there may be no consistency between setting values. Therefore, selection between restoration and initialization of setting values based on consistency may be meaningful. The second example of the predetermined condition is that a setting value to be restored and a setting value to be returned to an initial value are determined in advance as a specific condition. A specific example of the specific condition is a condition that a setting value for a destination in setting for communication is to be restored. In this example, a setting value for a destination represents a FAX number for FAX transmission, an e-mail address for e-mail transmission, or the like. Alternatively, a condition that a setting value selected from options provided in advance in an apparatus is to be returned to an initial state and a setting value uniquely input by a user (a specific character or numerical value such as a FAX number or an e-mail address is uniquely input) is to be restored may be set. This is because it is assumed that information uniquely input by a user requires time and effort for input compared to a case where setting is performed based on an option provided in advance in an apparatus, and the time and effort may thus be removed. A setting value selected from an address book registered by a user may be set as a target to be restored. Another specific example may be a condition that a setting value for a destination is not to be restored. Inputting a destination requires time and effort and has a risk of wrong transmission. Therefore, a setting value for a destination may be initialized.

Selection by a user is not necessarily performed for all the cases and may be performed only when a specific condition is satisfied. Examples of the specific condition include a condition that a change between a state at a switching time and an initial state is equal to or more than a threshold or a condition that there is a change in a specific setting value. In the case where a user is not allowed to perform selection, various settings may be performed regarding in which state recovery is to be performed (for example, restoration is performed in a state at a switching time, display is performed in an initial state, etc.).

The UI 30 includes a display 32 of a touch panel type and a home button 34. The display 32 includes a display screen such as a liquid crystal screen, and a home screen, screens for applications, and the like are displayed on the display 32. Typically, display for an application is implemented when a window for the application is displayed. Furthermore, a user may operate on the display 32 in accordance with display on the display 32 by making a finger of the user or an input pen in contact with the display 32. Examples of operation include an operation for changing display of a window (switching between windows, allowing windows to overlap, sliding a window, changing the size of a window, etc.), an operation for changing display within a window (a scroll operation, an operation for selecting a displayed button or the like, an operation for inputting a character or the like, etc.), an operation for changing a setting value which may be set within a window, and the like. In the case where a user operation is performed, the UI 30 outputs information of the user operation to the controller 20. The controller 20 performs corresponding processing, and provides feedback to display of the display 32 according to need.

The home button 34 is a button which receives a user operation for setting the screen of the display 32 to a home screen. On the home screen, icons for plural applications are displayed, and setting is performed such that an application corresponding to a selected icon is started.

The scanner 40 performs processing for scanning light on a paper medium set at a predetermined position to generate image data corresponding to reflected light. Furthermore, the printer 42 performs processing for reading image data to perform printing on a paper medium. The image data may be input from the scanner 40 (in this case, function as a so-called copying machine) or input from the outside. The communication unit 44 controls communication with the outside. Communication may be implemented in accordance with various protocols including telephone, FAX, and Internet protocols. For example, when image data generated by the scanner 40 is transmitted to a destination in accordance with a FAX protocol, the image processing apparatus 10 functions as a FAX, and when the same data is transmitted to a destination in accordance with an e-mail protocol, the image processing apparatus 10 functions an apparatus for transmitting an e-mail including an image attached thereto. The memory 46 stores various programs and data including a program and data for control to be used by the controller 20 and image data to be used by the scanner 40 and the printer 42, and manages the stored programs and data. A network 50 is various communication lines including a telephone line and the Internet. The communication unit 44 is connected to the network 50.

First Exemplary Embodiment

Next, operation of the image processing apparatus 10 according to a first exemplary embodiment will be explained with reference to FIGS. 2 and 3.

Figure 2:
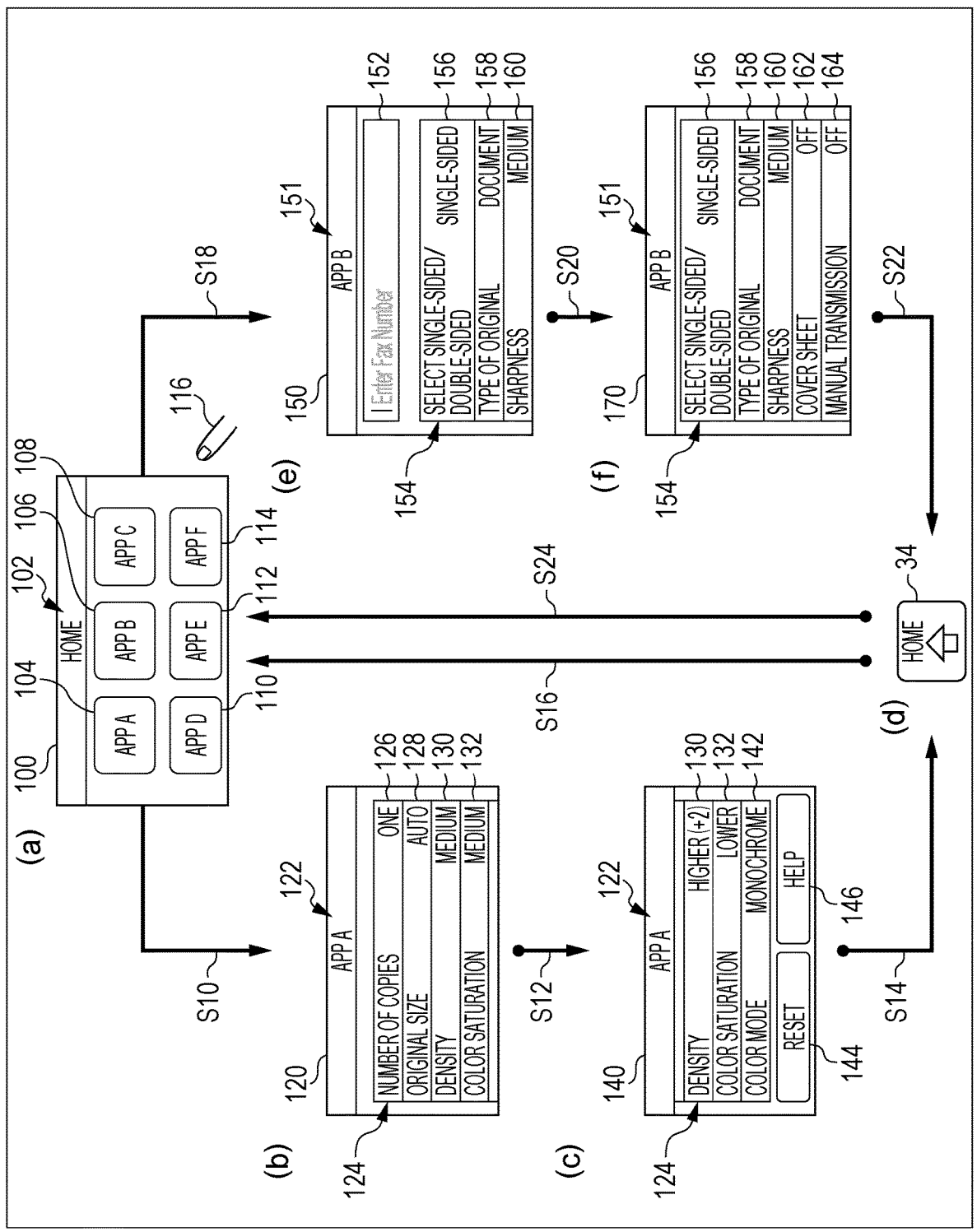
FIG. 2 is a diagram for explaining a flow of startup of an application.

FIG. 2 is a diagram illustrating an example of transition of screens displayed on the display 32 of the UI 30 in accordance with an operation procedure performed by a user. It is assumed that in the image processing apparatus 10, plural users perform desired image processing by using the same UI 30. For example, in the case where operation by a user has not been performed for a predetermined period of time, the activation state of an application is initialized (terminated), and a home screen 100 illustrated in part (a) of FIG. 2 is displayed. A user may operate the UI 30 as a general user without being authenticated or may log in as an authenticated specific user and operate the UI 30.

On the home screen 100, a title bar 102 indicating that the screen is a home screen, an icon 104 for application A, an icon 106 for application B, an icon 108 for application C, an icon 110 for application D, an icon 112 for application E, and an icon 114 for application F are displayed. In the case where there are more applications that may be used by users, icons corresponding to the applications may be displayed by scrolling or page switching. An icon functions as a startup switch for starting an application corresponding to the icon and then functions as a recovery switch for causing the started and switched application to be recovered.

In this example, it is assumed that the application A is an application for performing basic setting for copying and the application B is an application for performing basic setting for FAX. For example, when a user touches the icon 104 for the application A on the home screen 100 using his or her finger 116, the application A is started. That is, a signal corresponding to a user operation from the UI 30 is input to the controller 20, and the application controller 22 calls a program of the application A and starts the application A. At the startup of the application A, an initial value set by the setting processing unit 24 is set as a setting value. Furthermore, the display processing unit 26 performs processing for generating a display image corresponding to the application A and outputting the display image to the UI 30 (step S10 in part (a) of FIG. 2).

Part (b) of FIG. 2 illustrates an application A screen 120 in an initial state. On the application A screen 120, a title bar 122 indicating that the screen is for the application A and a setting list 124 indicating the state of setting values for the application A are displayed. In the setting list 124, a number-of-copies field 126, an original size field 128, a density field 130, a color saturation field 132, and other fields which may not be displayed on the range of the screen are displayed, and initial values are set such that "one" is set for the number of copies, "auto" is set for the original size, "medium" is set for the density, and "medium" is set for the color saturation. A user is able to change setting values for the individual fields of the setting list 124 by operating the application A screen 120. A setting value in the setting list 124 may be changed when a signal corresponding to a user operation from the UI 30 is input to the controller 20 and the setting processing unit 24 sets a value corresponding to the signal for the application A. Furthermore, in the process of a user operation, the display processing unit 26 performs scrolling of the setting list 124, change processing for an input value for each field, and the like in accordance with a user operation, and outputs results of the processing to the UI 30.

Part (c) of FIG. 2 illustrates a display screen obtained by an operation by the user (S12). That is, part (c) of FIG. 2 illustrates an application A screen 140 after setting is changed. On the application A screen 140, there is no change in the title bar 122 in an upper part of the screen. However, the display position of the setting list 124 displayed below the title bar 122 is changed as a result of a setting operation performed by the user. That is, the setting list 124 slides in an upward direction in accordance with a scroll operation, and the density field 130 displayed in a relatively lower position in part (b) of FIG. 2 is displayed in an upper part in part (c) of FIG. 2. Furthermore, the color saturation field 132 is displayed below the density field 130, and a color mode field 142, which is not fully displayed in part (b) of FIG. 2, is displayed below the color saturation field 132 in part (c) of FIG. 2. In the density field 130, the density is changed to a value of "higher+2". In the color saturation field 132, the color saturation is changed to a value of "lower". Furthermore, in the color mode field 142, the color mode is set to a value of monochrome. Below the setting list 124, a reset button 144 and a help button 146 are displayed. The reset button 144 is a button to be used for an operation for collectively returning values of the setting list 124 to initial values, and the help button 146 is used to call a help page for providing explanation of a setting method for a setting value and printing to a user. The user is able to perform copying by pressing a copy start button, which is not illustrated in part (c) of FIG. 2 at this point in time. In this case, in the controller 20, copying is performed when the application controller 22 outputs a control signal in accordance with setting values and the scanner 40 and the printer 42 are controlled.

Part (d) of FIG. 2 is a diagram illustrating that on the application A screen 140 after setting is changed, the user operation moves onto the home button 34 of the UI 30 (S14). When the user presses the home button 34, the screen of the display 32 is switched from the application A screen 140 after setting is changed (S16), and the home screen 100 illustrated in part (a) of FIG. 2 is displayed again. At this time, the setting processing unit 24 causes the memory 46 to store setting values set at the switching time, and the display processing unit 26 causes the memory 46 to store the display state of the setting list 124 displayed at the switching time.

Figure 5:
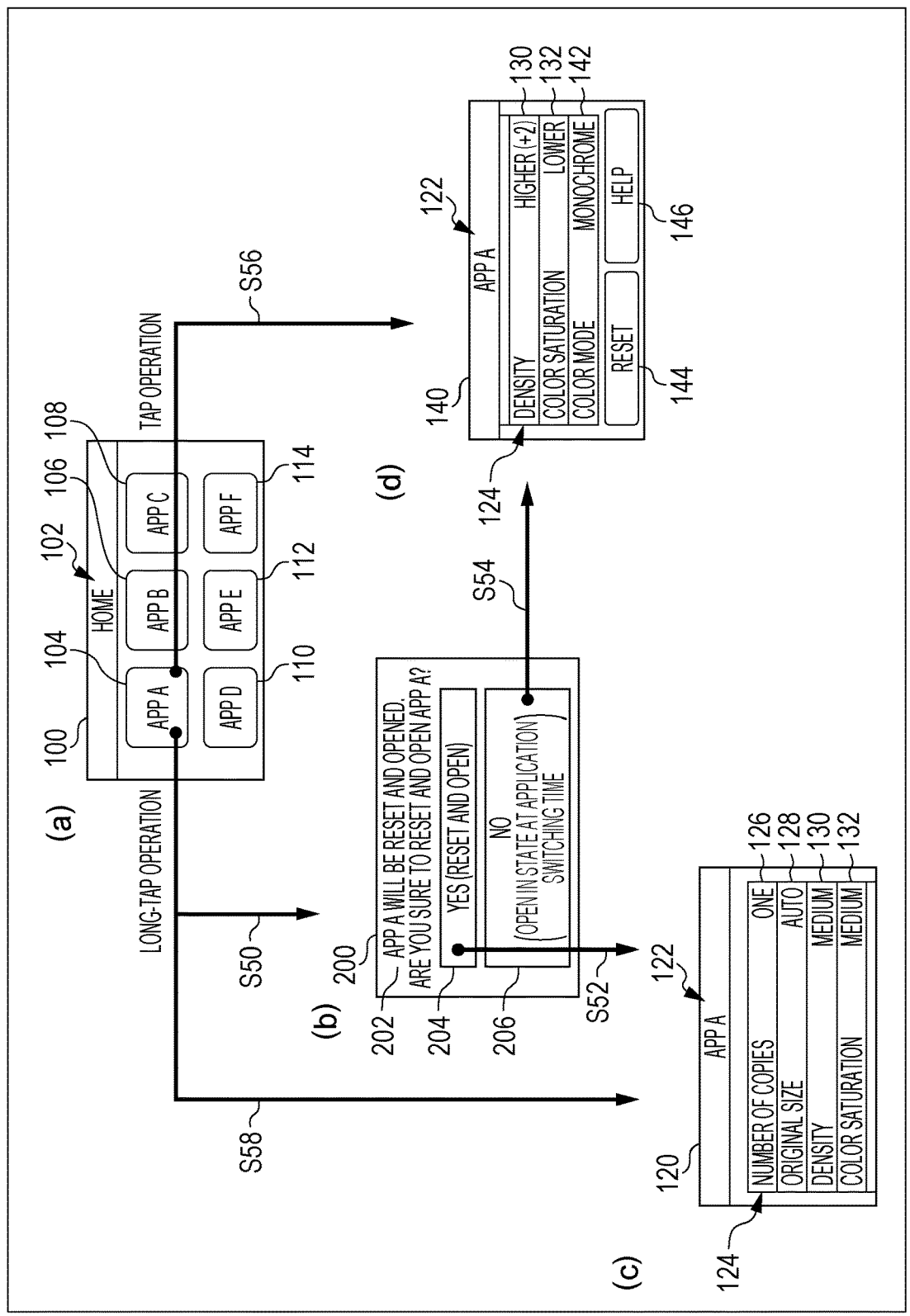
FIG. 5 is a diagram for explaining a flow of recovery of an application.

Then, the user touches the icon 106 for the application B on the home screen 100, so that the application B is started (S18). At this time, a signal corresponding to the user operation from the UI 30 is input to the controller 20, and the application controller 22 calls a program of the application B to start the application B. Startup is performed in accordance with initial values set by the setting processing unit 24. Furthermore, the display processing unit 26 generates a display screen corresponding to the application B, and causes the display 32 to display the display screen. As a result, on the screen of the display 32, an application B screen 150 in the initial state illustrated in part (e) of FIG. 5 is displayed. On the application B screen 150, a title bar 151 indicating the application B, a FAX number input field 152 provided below the title bar 151, and a setting list 154 provided below the FAX number input field 152 are displayed. The setting list 154 includes a single-sided/double-sided selection field 156, an original type field 158, and a sharpness field 160. In the initial state, "single-sided" is set for the single-sided/double-sided selection, "document" is set for the original type, and "medium" is set for the sharpness.

The user touches the display 32 with his or her finger to perform only a scroll operation (S20). At this time, the display processing unit 26 performs processing for moving the display screen upward or downward in accordance with the operation, and an application B screen 170 after only screen scrolling is performed is displayed as illustrated in part (f) of FIG. 2. On the application B screen 170, display position slides in an upward direction, the FAX number input field 152 is hidden, and only the setting list 154 is displayed. Therefore, in the setting list 154, a cover sheet field 162 and a manual transmission field 164 are also displayed below the single-sided/double-sided selection field 156, the original type field 158, and the sharpness field 160. Setting values for the individual fields are in the initial state. At this stage, the user does not set a destination in the FAX number input field 152. Therefore, FAX transmission may not be performed.

The user pays attention again to the home button 34 illustrated in part (d) of FIG. 2 (S22). When the user presses the home button 34 (S24), the display 32 is switched and the home screen 100 illustrated in part (a) of FIG. 2 is displayed again. At this time, the state of the application B screen at the switching time is stored. That is, the setting processing unit 24 causes the memory 46 to store setting values set at the switching time (however, all of these values are initial values), and the display processing unit 26 causes the memory 46 to store the display state displayed at the switching time.

Figure 3:
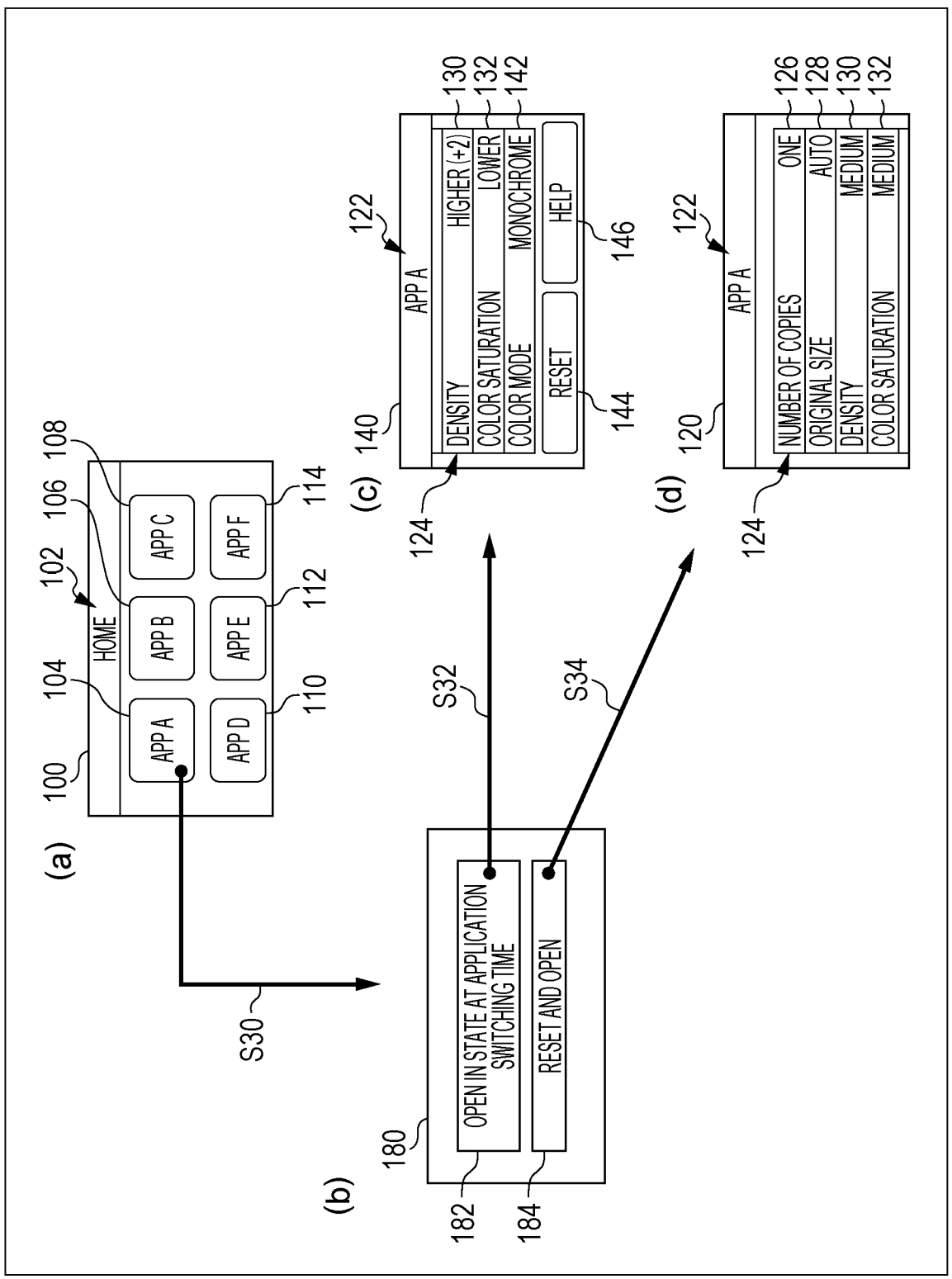
FIG. 3 is a diagram for explaining a flow of recovery of an application.

FIG. 3 is a diagram illustrating a flow subsequent to the flow illustrated in FIG. 2, and illustrates an example of transition of screens displayed on the display 32 of the UI 30 in accordance with an operation procedure performed by the user. Part (a) of FIG. 3 illustrates the home screen 100 displayed after step S24 of FIG. 2. The home screen 100 is the same as that illustrated in part (a) of FIG. 2. The user selects the icon 104 for the application A again on the home screen 100, so that switching to the application A is performed (S30).

At this time, as illustrated in part (b) of FIG. 3, a confirmation screen 180 is displayed. On the confirmation screen 180, a button 182 for selecting "open in a state at the application switching time" and a button 184 for selecting "reset and open" for the application A are displayed. This processing is controlled by the switching processing unit 28. This is because, as a condition for the switching processing unit 28 to present the confirmation screen 180, a condition that, for the application A at the switching time, at least one of a setting value and a display state is changed from the initial state is set. Therefore, if a setting value is not changed from an initial value and there is no change in the display screen, the confirmation screen 180 is not displayed.

Then, when the user presses the button 182 (S32), the application A screen 140 illustrated in part (c) of FIG. 3 is displayed. The application A screen 140 is the same as the application A screen 140 illustrated in part (c) of FIG. 2, and the display state immediately before switching to the home screen 100 is performed is restored. Furthermore, for setting values, setting contents at the switching time including the number-of-copies field 126 and the original size field 128, which are in the range not being displayed, are also restored. In contrast, when the user selects the button 184 (S34), the application A screen 120 in the initial state is displayed as illustrated in part (d) of FIG. 3. The application A screen 120 is the same as that illustrated in part (b) of FIG. 2. Furthermore, all the settings including setting for the color mode, which is not illustrated in part (d) of FIG. 3, are set to initial values. Processing for restoring the initial state or the previous state is performed by the switching processing unit 28 in conjunction with the setting processing unit 24 and the display processing unit 26, on the basis of user selection.

In the explanation provided above, restoration represents a state in which both a setting value and a display state are returned to the original state. However, a setting value and a display state may be partially restored. For example, in the case where the display screen includes the current time or an item that varies with time, such as the current computer status (the number of log-in people, the job processing status, the amount of memory used, etc.), the current status may be displayed, instead of restoring such an item. Examples of an item restored on display include a displayed hierarchical layer, a displayed range, a displayed character, a displayed numerical value, a displayed sign, and the like. Furthermore, only a setting value may be restored as the original state, but a scrolled window may be returned to the original state.

Second Exemplary Embodiment

Figure 4:
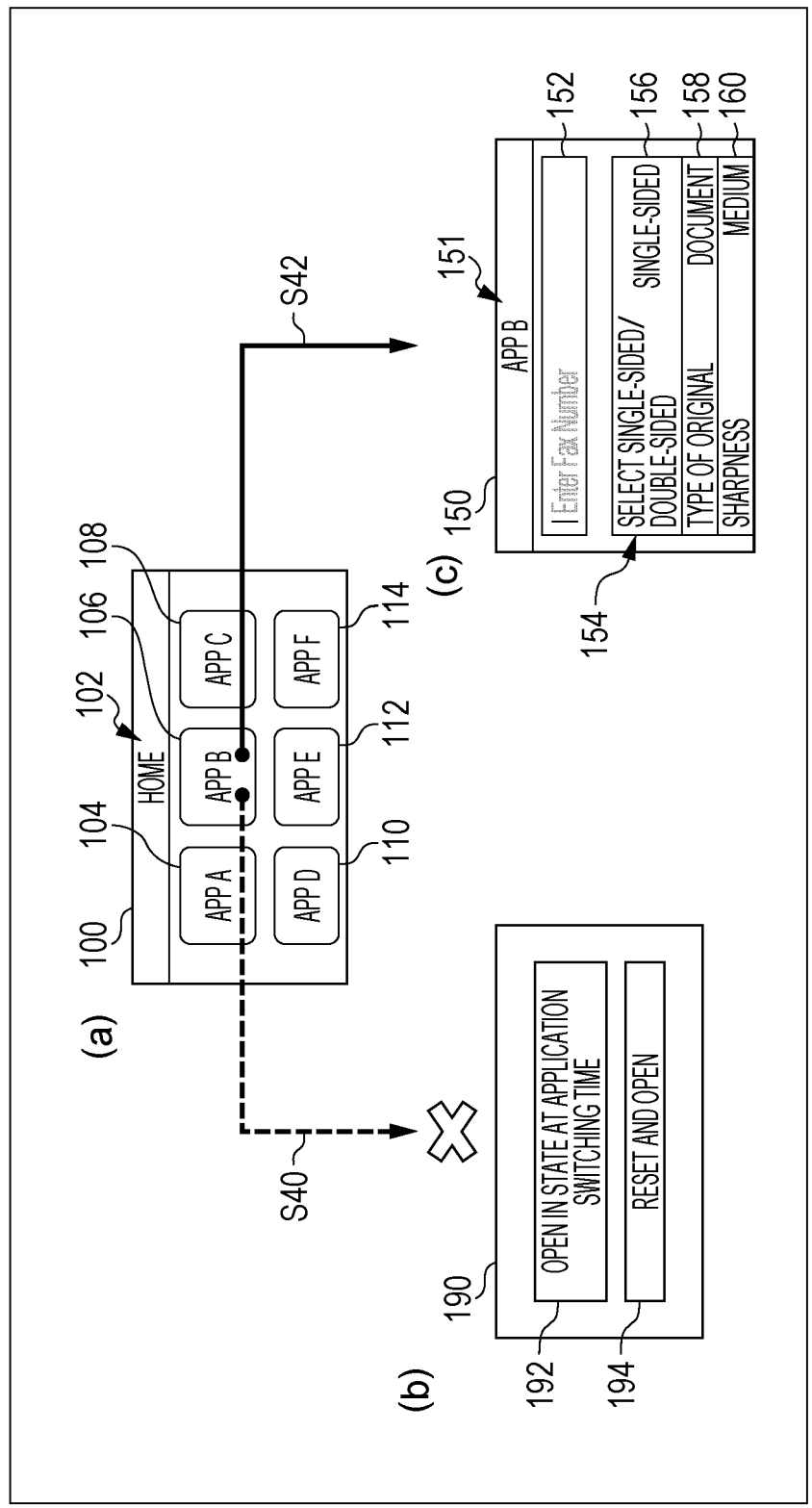
FIG. 4 is a diagram for explaining a flow of recovery of an application.

FIG. 4 is a diagram illustrating another flow after the user operation explained with reference to FIG. 2 is performed, and illustrates an example of transition of screens displayed on the display 32 of the UI 30 in accordance with an operation procedure performed by the user. However, in a second exemplary embodiment, a condition for displaying a confirmation screen is different from the first exemplary embodiment.

The home screen 100 illustrated in part (a) of FIG. 4 is the same as those illustrated in part (a) of FIG. 2 and part (a) of FIG. 3. The user presses the icon 106 for the application B, so that the application B is selected again. Part (b) of FIG. 4 illustrates a confirmation screen 190 which may be displayed (S40) as a result of the user operation. On the confirmation screen 190, a button 192 for selecting "open in a state at the application switching time" and a button 194 for selecting "reset and open" are displayed. However, in this example, the switching processing unit 28 operates under the condition that a selection screen is displayed when setting for a setting value is changed at the last switching time, and the selection screen is not displayed in the case where only the display state is changed at the last switching time. For the application B, at the last switching time, the display state is changed but there is no change in a setting value because only screen scrolling is performed. Therefore, the confirmation screen 190 illustrated in part (b) of FIG. 4 is not displayed. Thus, when the icon 106 for the application B is pressed (S42), the application B screen 150 in the initial state is displayed as illustrated in part (c) of FIG. 4, instead of displaying the confirmation screen 190 illustrated part (b) of FIG. 4. The application B screen 150 is the same as that illustrated in part (e) of FIG. 2.

In the second exemplary embodiment, in the case where only the display state is changed, the screen in the initial state is displayed, instead of displaying the selection screen, at the switching time. However, the selection screen may be displayed in the case where a change in the display state exceeds a certain condition. For example, a change occurs when a window in a lower layer is called from a window in the initial state is larger than a change occurs when the display state is changed within the same window. Therefore, in this case, the selection screen may be displayed.

Third Exemplary Embodiment

FIG. 5 is a diagram illustrating another flow after the user operation explained with reference to FIG. 2 is performed, and illustrates an example of transition of screens displayed on the display 32 of the UI 30 in accordance with an operation procedure performed by the user. However, in a third exemplary embodiment, a condition for displaying a confirmation screen is different from the first exemplary embodiment.

The home screen 100 illustrated in part (a) of FIG. 5 is the same as that illustrated in part (a) of FIG. 2 in terms of display. However, the home screen 100 illustrated in part (a) of FIG. 5 is different from the home screen 100 illustrated in part (a) of FIG. 2 in a method for inputting a user operation. That is, a user is able to perform different operations between a case where the user presses the display 32 of the touch panel type using his or her finger for a relatively long time and then releases his or her finger from the display 32 (may be referred to as a long tap) and a case where the user presses the display 32 using his or her finger for a relatively short time and then releases his or her finger from the display 32 (may be simply referred to as a tap).

In the case where the user long-taps the icon 104 for the application A as illustrated in part (a) of FIG. 5, a confirmation screen 200 illustrated in part (b) of FIG. 5 is displayed (a long tap performed here is an example of a selection-type recovery event) in accordance with the flow of step S50. On the confirmation screen 200, a question display 202 indicating "App A will be reset and opened. Are you sure to reset and open App A?" is displayed, and a button 204 for selecting "Yes (reset and open)" and a button 206 for selecting "No (Open in a state at the application switching time)" are displayed below the question display 202. That is, it is assumed that the Application A is opened in the initial state, and the user is required for confirmation before the application A is recovered.

When the user selects the button 204 (S52), the application A screen 120 in the initial state illustrated in part (c) of FIG. 5 is displayed. The application A screen 120 is the same as that illustrated in part (b) of FIG. 2. All the setting values including values outside the range illustrated in part (c) of FIG. 5 are set to initial values. In contrast, when the button 206 is pressed (S54) in part (b) of FIG. 5, the application A screen 140 after setting is changed is displayed as illustrated in part (d) of FIG. 5. The application A screen 140 is the same as that illustrated in part (c) of FIG. 2, and setting values including values outside the range illustrated in part (d) of FIG. 5 are the same as those illustrated in part (c) of FIG. 2. That is, all the setting values and the display state at the time of switching of the application A are restored.

In contrast, when the user simply taps the icon 104 for the application A in part (a) of FIG. 5 (S56), the application A screen 140 illustrated in part (d) of FIG. 5 is immediately displayed without the confirmation screen being displayed (a tap performed here is an example of a non-selection-type recovery event). That is, on the home screen 100 illustrated in part (a) of FIG. 5, a tap operation is an operation for restoring the previous state for recovery of an application, and a long-tap operation is an operation for returning to the initial state (however, further confirmation is performed on the confirmation screen).

In part (a) of FIG. 5, when the user long-taps the icon 104 for the application A (S58), the application A screen 120 in the initial state may be immediately displayed as illustrated in part (c) of FIG. 5, without the confirmation screen 200 being displayed. In this case, compared to the case where the confirmation screen is displayed, the state illustrated in part (c) of FIG. 5 may be reached one-screen more quickly (in this example, the user is allowed to select between a long tap and a tap for a recovery method).

As described above, another aspect may be provided for allowing a user to select a state in which an application is to be recovered at a stage in which the user selects the application to be recovered. For example, the user may be allowed to select a state at a switching time by allocating different input methods for the same button or icon for a touch panel, such as input by a tap and a double tap, instead of input by a tap and a long tap.

Figure 6:
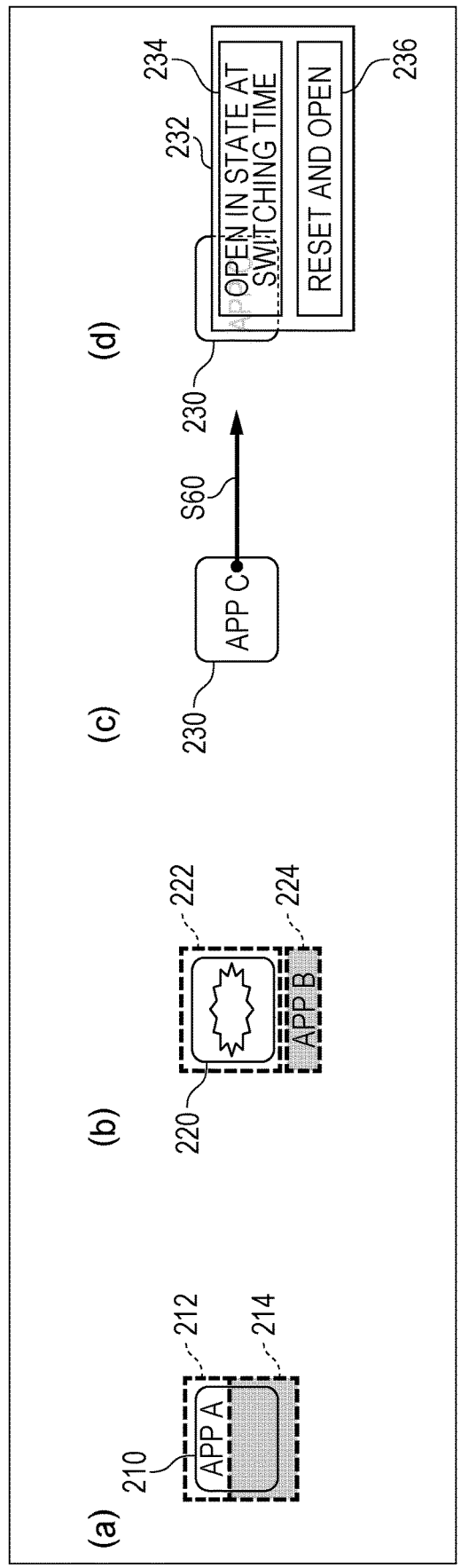
FIG. 6 is a diagram for explaining selection of an application and recovery.

Now, modifications will be explained with reference to FIG. 6. Part (a) of FIG. 6 illustrates an icon 210 for the application A displayed on the home screen 100. For the icon 210, setting is performed such that different screens are displayed between the case where a relatively upper region 212 including characters "App A" indicated in an upper part is pressed and the case where a lower region 214 is pressed. For example, an operation for restoring the previous state is allocated to the region 212, and display in the initial state is allocated to the region 214.

In part (b) of FIG. 6, an icon 220 for the application B is displayed. In the icon 220, a figure is displayed, and characters "App B" is displayed below the icon 220. In this example, isolation of the recovery state is performed between an operation for pressing a region 222 of the icon 220 and an operation for pressing a region 224 including the characters below the icon 220. For example, the previous state is restored when the region 222 is pressed, and the initial state is displayed when the region 224 is pressed.

Confusion of users who do not understand a mechanism for displaying the restored state or the initial state may be avoided by allocating a state which may be considered as being highly required by a user to a region which may be considered as being normally pressed by the user (in the case of part (b) of FIG. 6, may be the region 222). Furthermore, the user may be allowed to recognize the presence of two regions by displaying the region 212 and the region 214 in slightly different colors in part (a) of FIG. 6. In any case, in the case where an icon for an application and a recovery method are displayed in association with each other, the user resumes the application by selecting the application and the recovery method at the same time.

Part (c) of FIG. 6 and part (d) of FIG. 6 illustrate a series of input operations. When the user simply presses an icon 230 for the application C illustrated in part (c) of FIG. 6, for example, the application C is recovered in the state at the switching time. However, in the case where the user touches the icon 230 for a relatively long time (S60), in a region of a selection screen 232 based on a small window indicated above part of the icon 230, the icon 230 is displayed such that the icon 230 may be slightly seen through the selection screen 232 (the selection screen 232 is superimposed on the icon 230, but the icon 230 is clearly indicated), as illustrated in part (d) of FIG. 6. A button 234 for selecting "open in a state at the switching time" is displayed at the position where a finger is placed, and a button 236 for selecting "reset and open" is displayed below the button 234. The user is able to recover the application C in a state corresponding to the button selected by the user.

An aspect in which selection may be performed on display where a confirmation screen is superimposed on the original screen using a small window, as illustrated in part (d) of FIG. 6, may be adopted in another exemplary embodiment. For example, in the example of FIG. 3, the home screen 100 illustrated in part (a) of FIG. 3 may be switched to the confirmation screen 180 illustrated in part (b) of FIG. 3. However, a confirmation screen based on a small window may be displayed superimposed on the home screen 100 illustrated in part (a) of FIG. 3.

Fourth Exemplary Embodiment

Figure 7:
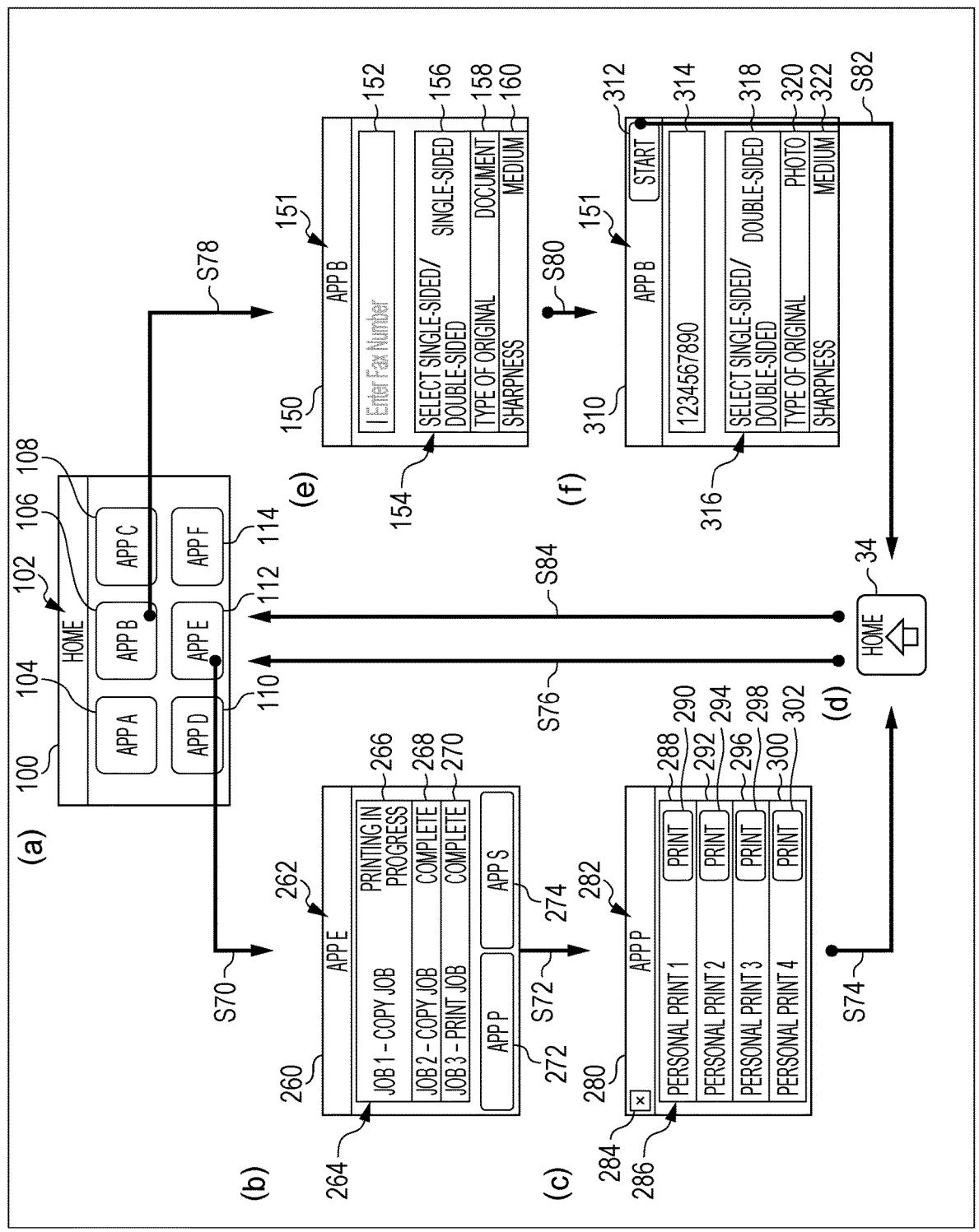
FIG. 7 is a diagram for explaining a flow of startup of an application.

FIG. 7 is a diagram illustrating a flow in which a user starts a new application, and illustrates an example of transition of screens displayed on the display 32 of the UI 30 in accordance with an operation procedure performed by a user.

Part (a) of FIG. 7 illustrates the home screen 100. The home screen 100 is the same as screens illustrated in part (a) of FIG. 2 and the like. The user selects the icon 112 for the application E (S70). At this time, the application E is newly started, and an application E screen 260 is displayed as illustrated in part (b) of FIG. 7. The application E screen 260 is the top screen for the application E (a screen which is in the highest layer of plural layers and is normally displayed at first). It is assumed that the application E is software for displaying a job which is processed at the image processing apparatus 10 and designated by a user. Therefore, on the application E screen 260, a job list 264 at this point in time is displayed below a title bar 262 for the application E. In the example illustrated in part (b) of FIG. 7, the job list 264 includes a job 1 field 266 (this field indicates that a copy job is being printed), a job 2 field 268 (this field indicates that another copy job is completed), and a job 3 field 270 (this field indicates that a print job is completed). Furthermore, below the job list 264, a button 272 for calling an application P and a button 274 for calling an application S are displayed. The application P and the application S are lower-level applications based on the assumption of the presence of the application E. The application P and the application S are not started independently from the application E, and is started within the application E. Furthermore, it is assumed that the application P is started after a user is authenticated.

When the user selects the button 272 for the application P (S72), the user inputs a personal identification number or the like to receive user authentication, and an application P screen 280 illustrated in part (c) of FIG. 7 is displayed. The application P screen 280 is the top screen for the application P. On the application P screen 280, a title bar 282 is displayed in an upper part, and an end button 284 for terminating this window is displayed at the left corner within the title bar 282. Below the title bar 282, a job list 286 which may be input by an individual user is displayed. That is, a first field 288 relates to a job for personal print 1, and a button 290 for issuing a printing instruction is displayed. A second field 292 relates to personal print 2, and a button 294 for issuing a printing instruction is displayed. A third field 296 relates to a job for personal print 3, and a button 298 for issuing a printing instruction is displayed. A fourth field 300 relates to personal print 4, and a button 302 for issuing a printing instruction is displayed.

At this stage, when the user pays attention to the home button 34 illustrated in part (d) of FIG. 7 and presses the home button 34 (S76), the home screen 100 illustrated in part (a) of FIG. 7 is displayed again.

Now, the user selects the icon 106 for the application B on the home screen 100 (S78). At this time, the application B screen 150 in the initial state illustrated in part (e) of FIG. 7 is displayed. The application B screen 150 is the same as that illustrated in part (e) of FIG. 2. Then, the user inputs setting necessary for FAX on the application B screen (S80). As a result, as illustrated in part (f) of FIG. 7, an application B screen 310 after setting is changed is displayed. On the application B screen 310, a start button 312 for issuing an instruction to FAX transmission after preparation for FAX transmission is completed is displayed at the right corner of the title bar 151. Furthermore, below the title bar 151, a FAX number input field 314 in which a FAX number "1234567890" is input and a setting list 316 in which settings are input are displayed. In the setting list 316, setting for single-sided/double-sided selection in a single-sided/double-sided selection field 318 is changed from single-sided to double-sided, setting for the type of an original in an original type field 320 is changed from a document to a photograph, and setting for sharpness in a sharpness field 322 is set to medium without any change.

The user presses the start button 312 to perform FAX transmission (S82). Then, the user presses the home button 34 illustrated in part (d) of FIG. 7 (S84), and the home screen 100 illustrated in part (a) of FIG. 7 is returned.

Figure 8:
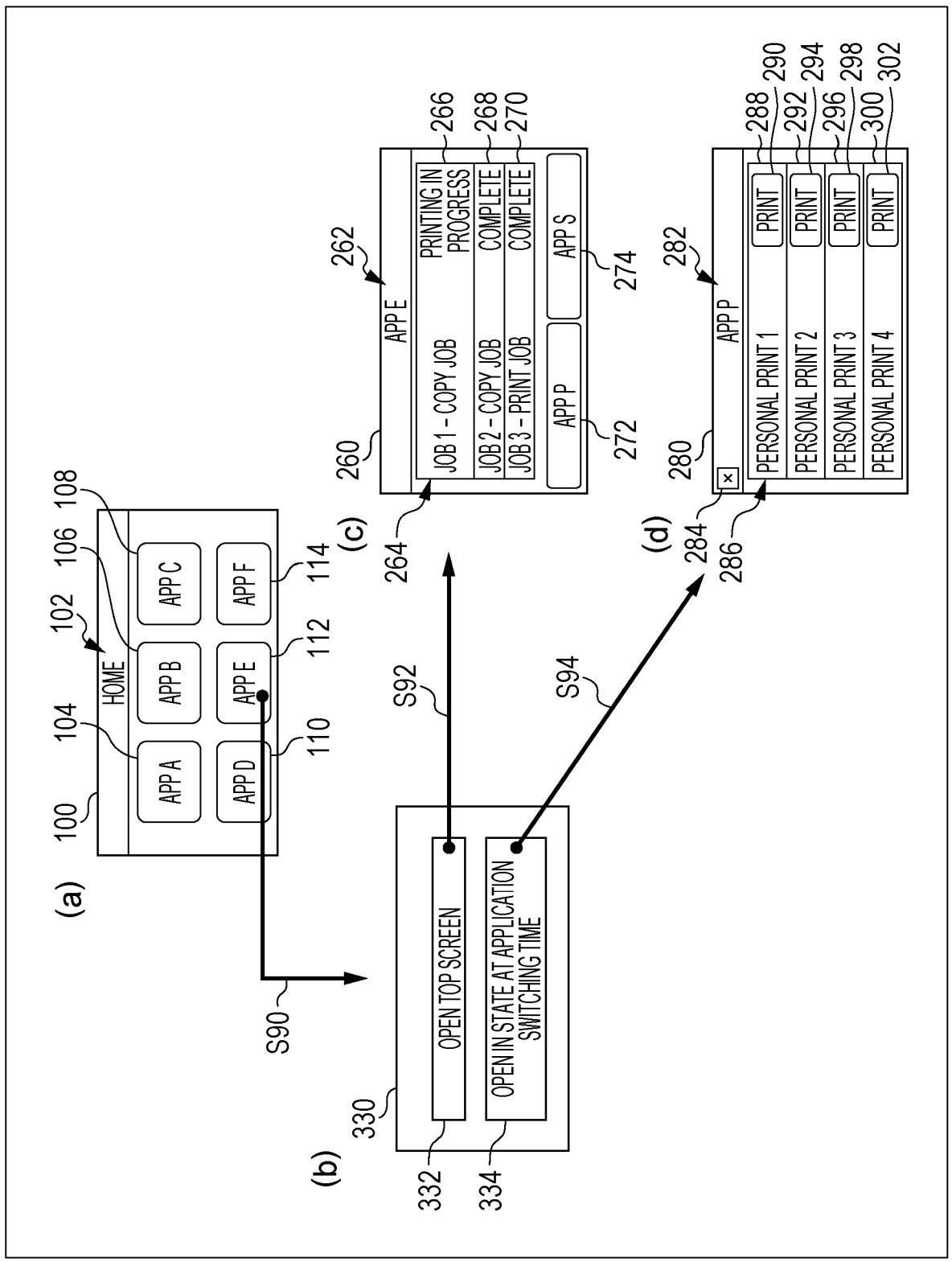
FIG. 8 is a diagram for explaining a flow of recovery of an application.

FIG. 8 is a diagram illustrating a flow after the user operation explained with reference to FIG. 7 is performed, and illustrates an example of transition of screens displayed on the display 32 of the UI 30 in accordance with an operation procedure performed by the user.

The home screen 100 illustrated in part (a) of FIG. 8 is the same as that illustrated in part (a) of FIG. 7. On the home screen 100, the user selects the application E again (S90). At this time, a confirmation screen 330 illustrated in part (b) of FIG. 8 is displayed. On the confirmation screen 330, a button 332 for selecting "open top screen" and a button 334 for selecting "open in a state at the application switching time" are displayed.

When the user selects the button 332 (S92), the application E screen 260 illustrated in part (c) of FIG. 8 is displayed. The application E screen 260 is the same as the top screen for the application E illustrated in part (b) of FIG. 7. However, depending on the length of time elapsed since that stage, the contents of the job list 264 displayed on the top screen for the application E vary.

In contrast, when the user selects the button 334 (S94), the application P screen 280 is displayed as illustrated in part (d) of FIG. 8. The application P screen 280 is the same as that illustrated in part (c) of FIG. 7. For display of part (c) of FIG. 7, user authentication is required. However, display of part (d) of FIG. 8 is in the process of flow after user authentication is completed. Therefore, user authentication is not performed again. Furthermore, for the application P screen 280, in the case where a job which may be input by the user within a period from switching to recovery is rearranged (for example, at a PC connected with the image processing apparatus 10), even for the same top screen, the contents of the job list 286 may vary.

In this example, the state in which the application P is called from the application E is the operation state at the switching time. Therefore, as a result of selection of recovery of the application E, the application P screen 280 is displayed. As described above, in the case where an application is started from a different application (in this example, a lower-level application is called from a higher-level application), a user may consider these applications as a series of applications. Therefore, displaying a state in which the lower-level application is called may be suitable.

Fifth Exemplary Embodiment

Figure 9:
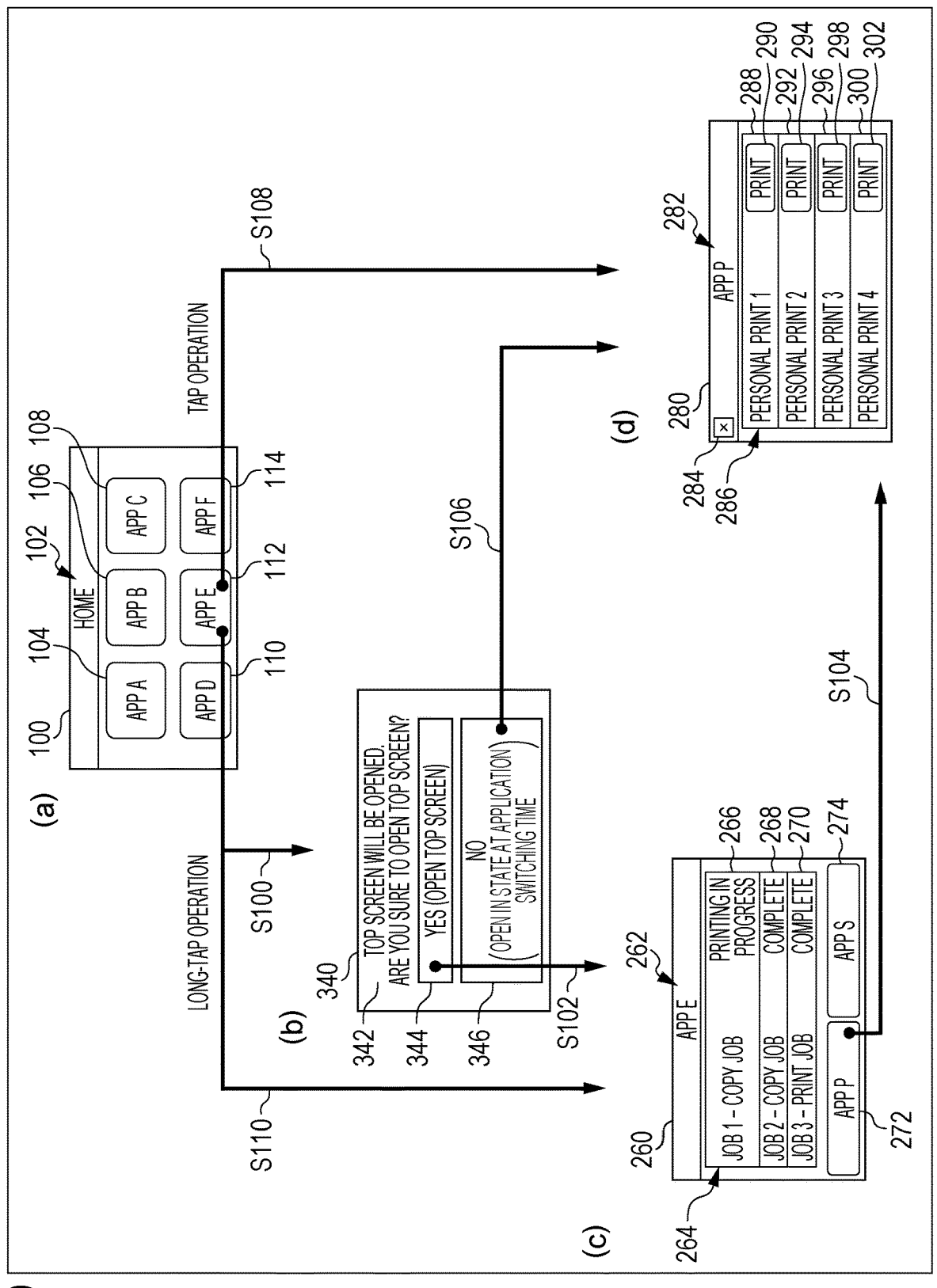
FIG. 9 is a diagram for explaining a flow of recovery of an application.

FIG. 9 is a diagram illustrating a flow after the user operation explained with reference to FIG. 7 is performed, and illustrates an example of transmission of screens displayed on the display 32 of the UI 30 in accordance with an operation procedure performed by the user.

The home screen 100 illustrated in part (a) of FIG. 9 is the same as that illustrated in part (a) of FIG. 7. On the home screen 100, the user selects the icon 112 for the application E. In the case where the user selects the icon 112 by a long tap (S100), for example, a confirmation screen 340 illustrated in part (b) of FIG. 9 is displayed. On the confirmation screen 340, a question display 342 indicating "Top screen will be opened. Are you sure to open a top screen?" is displayed, and a button 344 for selecting "Yes (open top screen)" and a button 346 for selecting "No (open in a state at the application switching time)" are displayed below the confirmation screen 340. When the button 344 is selected (S102), the application E screen 260 illustrated in part (c) of FIG. 9 is displayed. The application E screen 260 is the same as that illustrated in part (b) of FIG. 7. When the button 272 for calling the application P is selected on the application E screen 260 (S104), the application P screen 280 illustrated in part (d) of FIG. 9 is displayed. The application P screen 280 is the same as that illustrated in part (c) of FIG. 7.

In contrast, when the button 346 is selected in part (b) of FIG. 9 (S106), the application P screen 280 illustrated in part (d) of FIG. 9, which is in the state at the application switching time, is directly displayed. Furthermore, when the user selects the icon 112 for the application E on the home screen 100 by a simple tap operation (S108), the application P screen 280, which is in the state at the application switching time, illustrated in part (d) of FIG. 9 is directly displayed. In the case where the icon 112 for the application E is long-tapped on the home screen 100 (S110), the application E screen 260 illustrated in part (c) of FIG. 9 may be displayed without the confirmation screen 340 being displayed.

Sixth Exemplary Embodiment

Figure 10:
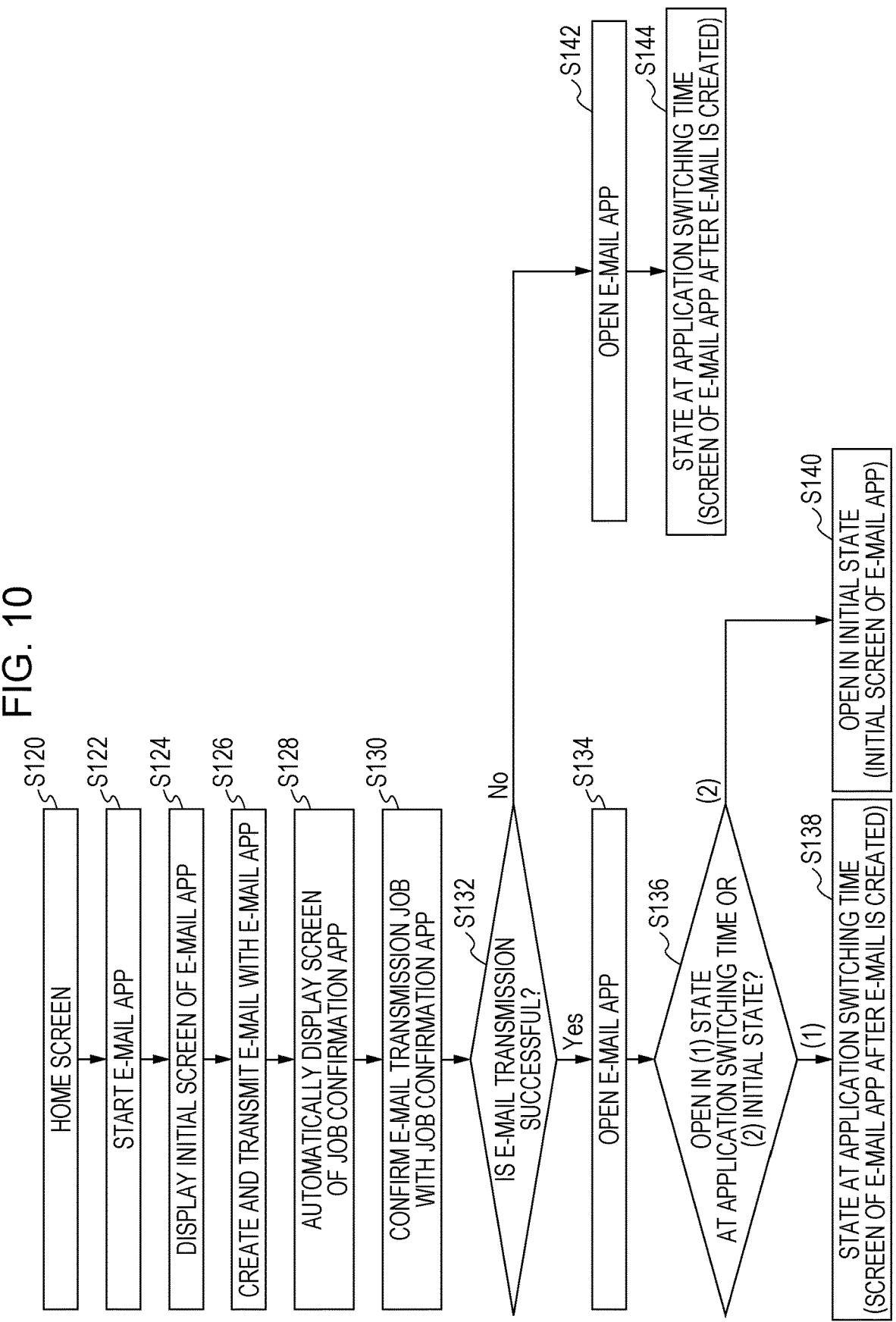
FIG. 10 is a flowchart illustrating a process from startup of an application to recovery of the application.

Next, the image processing apparatus 10 according to a sixth exemplary embodiment will be explained with reference to FIG. 10. FIG. 10 is a flowchart for explaining a case where an e-mail application which handles transmission and reception of e-mails and a job confirmation application such as the application E illustrated in FIG. 7 are started.

In a state where a home screen is displayed (S120), the e-mail application is selected and started (S122), and a screen of the e-mail application in the initial state is displayed (S124). A user creates an e-mail on this screen, and transmits the e-mail (S126). In this example, it is assumed that when e-mail transmission is performed using the e-mail application, the job confirmation application is automatically started and displayed on the screen (S128). The user confirms a job of e-mail transmission using the job confirmation application (S130), and determines whether or not e-mail transmission has been successful (S132). In the case where the e-mail transmission has been successful, when the e-mail application is recovered (S134), a confirmation screen for asking in which state the e-mail application is to be opened is displayed (S136). That is, on this confirmation screen, the user is allowed to select between (1) opening the e-mail application in the state at the application switching time and (2) opening the e-mail application in the initial state. In the case where the user selects (1) the state at the application switching time, a screen on which an e-mail has been created, which is in the state immediately before the e-mail is transmitted using the e-mail application, is displayed (S138). The user performs, for example, an operation for creating another e-mail by changing only a transmission destination while maintaining the body of the e-mail. In contrast, when the user selects (2) opening the e-mail application in the initial state, a screen of the e-mail application in the initial state is displayed (S140).

In contrast, in the case where e-mail transmission has been unsuccessful in step S132, when the e-mail application is recovered (S142), a screen on which an e-mail has been created, which is in the state at the application switching time, is directly displayed (S144). This is because it is assumed that the user will retry e-mail transmission.

In the example explained above, as in step S126, in the case where e-mail transmission is performed using the e-mail application, the screen is automatically switched from the e-mail application to the job confirmation application. As described above, in the case where it may be determined that an operation stops after an application completes a series of operations, the application may be automatically removed from the operation target. Furthermore, in the case where the application is recovered as the operation target, it is determined whether or not the last switching processing for removing the application from the operation target satisfies a specific condition (in this case, under the condition that a job for e-mail transmission, which is an operation for stopping processing, has been successful, and this is an example of an option presentation condition). In the case where the specific condition is satisfied, processing for allowing the user to confirm in which state the application is to be recovered is performed. Furthermore, in the case where the specific condition is not satisfied (in this case, a job for e-mail transmission has been unsuccessful), the application is recovered in the state at the last application switching time as a predetermined recovery method.

Seventh Exemplary Embodiment

Figure 11:
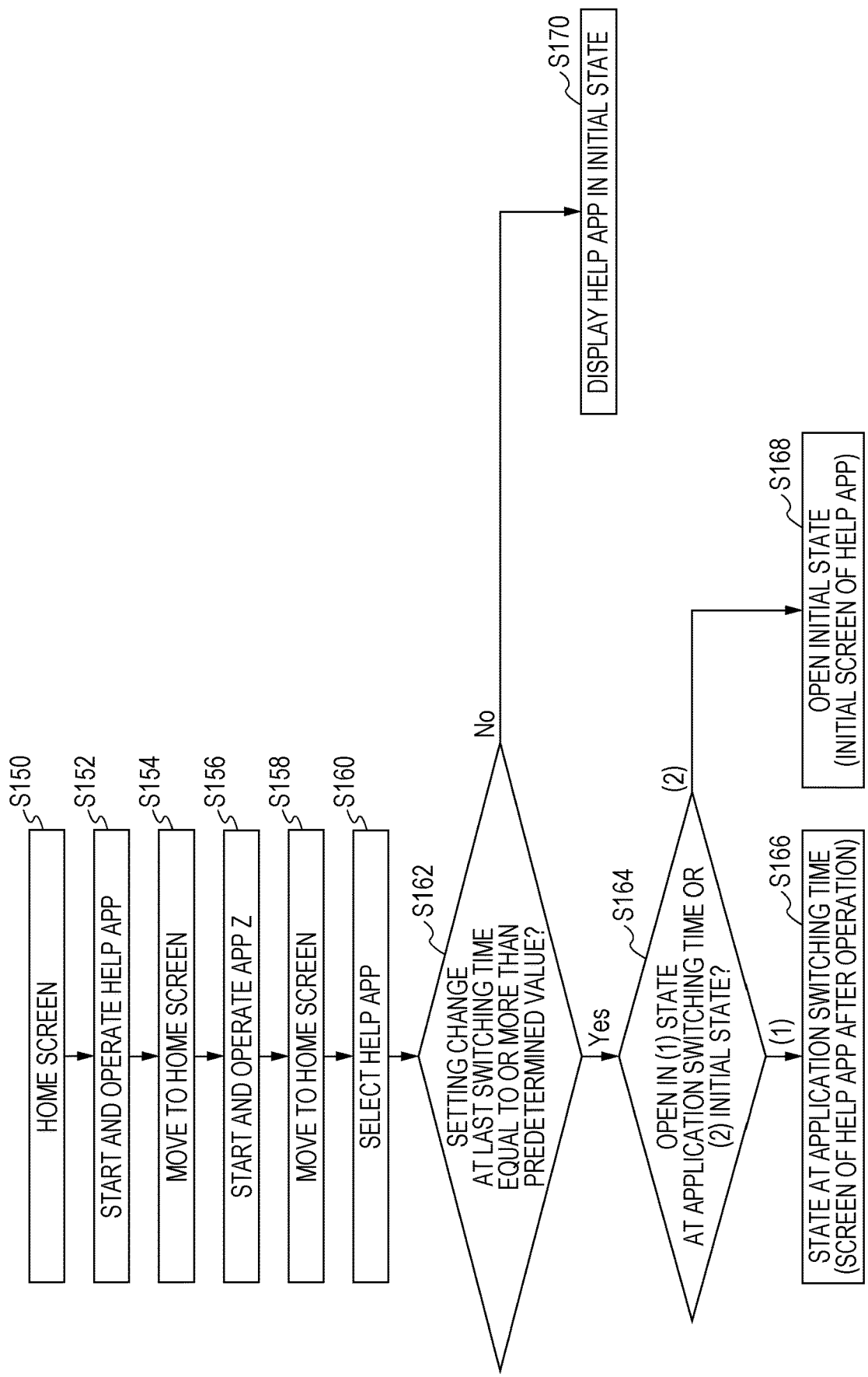
FIG. 11 is a flowchart illustrating a process from startup of an application to recovery of the application.

The image processing apparatus 10 according to a seventh exemplary embodiment will be explained with reference to FIG. 11. FIG. 11 is a flowchart for explaining a case where a Help application for displaying a help document and an application Z are started.

First, a home screen is displayed (S150), and a user selects an icon for the Help application and starts and operates the Help application (S152). Then, the user presses the home button 34 so that the home screen is displayed (S154). Then, the user starts and operates the application Z (S156), and the home screen is returned (S158). Then, the user selects the Help application again (S160).

At this time, it is determined whether or not a change in the Help application at the last switching time is equal to or more than a predetermined value (at least one of the degree of change in a display state from an initial screen and a change part of a setting value is equal to or more than a predetermined value) (S162). For example, in the case where the degree of change in the display state such as the depth of hierarchy or the number of windows called as in the case where a window in a deep hierarchy is called so that a help document is displayed or the number of setting values as in the case where a specific search keyword is set so that a document search is performed exceeds a threshold, a user selection screen for allowing a user to select a state in which the Help application is to be opened is displayed (S164). In this example, the user selects between (1) a state in the application switching time and (2) an initial state. In the case where (1) the state at the application switching time is selected, a screen on which an operation for the Help application has been performed is displayed. In contrast, in the case where (2) the initial state is selected, the initial screen of the Help application is displayed (S168). Furthermore, in the case where the change is less than the predetermined value in step S162, the Help application is displayed in the initial state (S170).

In this example, at the stage in which the last application switching is performed, in the case where the operation state of an application satisfies a specific condition (in this case, a condition regarding whether or not at least one of the degree of change in the display state from the initial screen and a change part of a setting value is equal to or more than a predetermined value, and this is an example of an option presentation condition), processing for allowing the user to select a recovery method for the application is performed. In the case where the condition is not satisfied, a predetermined recovery method is automatically selected. For example, for a low layer is displayed (the same as or lower than the layer of the initial state), display in the initial state is selected.

Ninth Exemplary Embodiment

In the explanation provided above, the image processing apparatus 10 has been explained as an example. However, an application apparatus is not limited to a specific processing apparatus, and may be implemented by various computers including so-called computer hardware such as a personal computer, a smartphone, and a control computer for various apparatuses. A computer that includes a function to execute plural applications and a function to cause some of the plural applications to be removed from an operation target for a user and to be recovered as an operation target for a user may achieve control for recovery.

Figure 12:
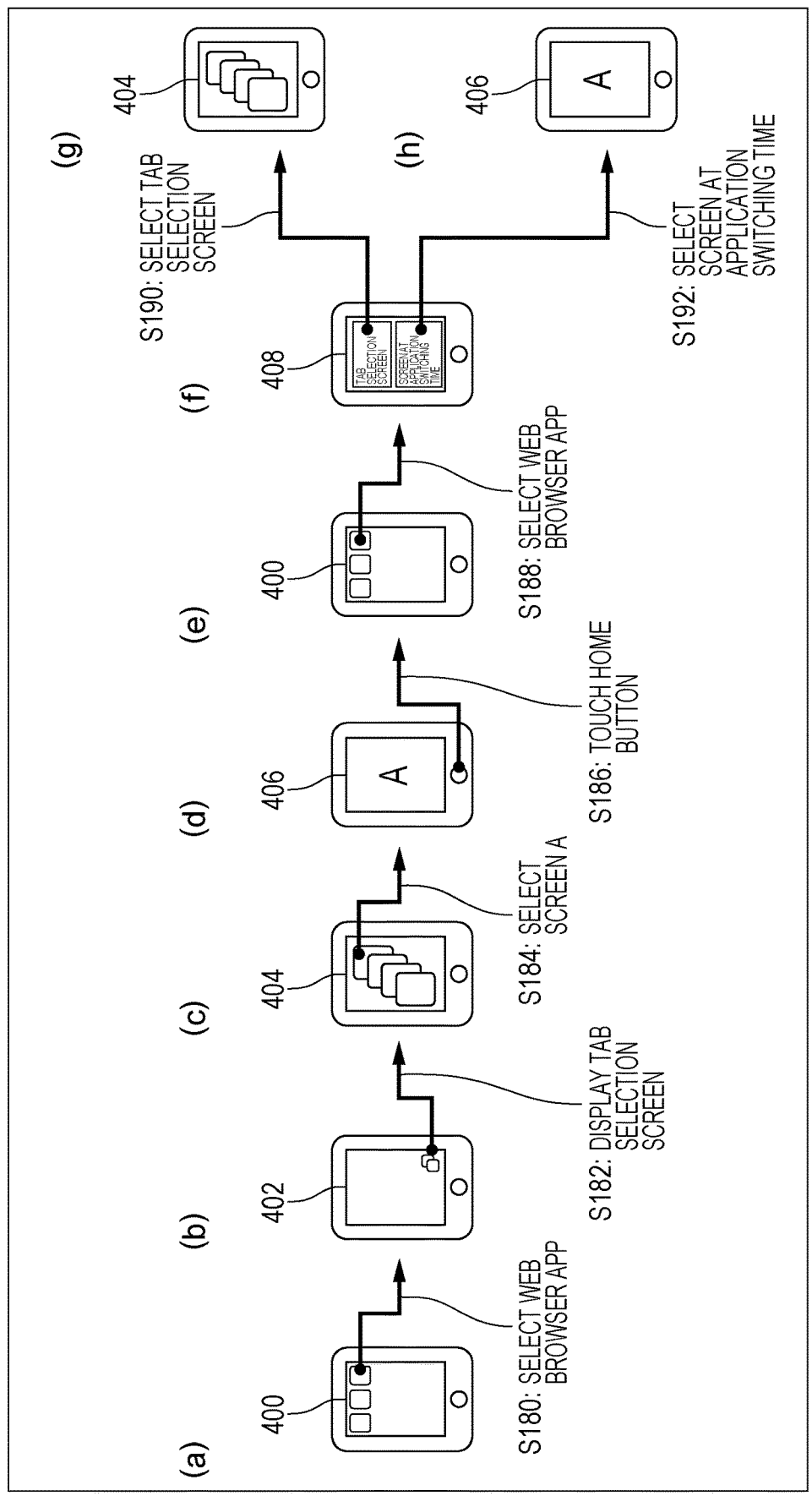
FIG. 12 is a diagram for explaining a flow from startup of a smartphone to recovery of the smartphone.

An example of a smartphone will be explained below with reference to FIG. 12. FIG. 12 is a diagram for explaining an example in which a user operation and transition of screens are sequentially performed on a display of a touch panel type of a smartphone.

Part (a) of FIG. 12 illustrates a home screen 400 of a smartphone. On the home screen 400, icons for plural applications are displayed. When a user selects a web browser application (S180), a web browser application screen 402 is displayed, as illustrated in part (b) of FIG. 12. The user performs, using a web browser, for example, an operation for accessing plural URLs and displaying web pages. A web page may be displayed using a tab. In a lower right part of the web browser application screen 402, a button for displaying a tab selection screen is displayed.

When the user presses this button to issue an instruction to display the tab selection screen (S182), a tab selection screen 404 for the web browser application is displayed, as illustrated in part (c) of FIG. 12. When the user selects a tab corresponding to a screen A from among plural tabs (S184), a screen A 406 for the web browser application is displayed, as illustrated in part (d) of FIG. 12. The user touches a home button (S186). As a result, the home screen 400 is displayed, as illustrated in part (e) of FIG. 12. The home screen 400 is the same as that illustrated in part (a) of FIG. 12.

Then, the user selects the web browser application on the home screen 400 (S188). At this time, a confirmation screen 408 is displayed on the smartphone, as illustrated in part (f) of FIG. 12. The confirmation screen 408 includes a button for selecting a tab selection screen and a button for selecting a screen at the application switching time. When the user selects the tab selection screen (S190), the tab selection screen 404 for the web browser application is displayed, as illustrated in part (g) of FIG. 12. The tab selection screen 404 is the same as that illustrated in part (c) of FIG. 12. However, in the case where the number of tabs is increased or decreased or in the case where a web page is moved in the transition to the screen illustrated in part (c) of FIG. 12, the contents of the tab change. In contrast, when the user selects the screen at the application switching time (S192), the screen A 406 for the web browser application is displayed, as illustrated in part (h) of FIG. 12. The screen A 406 is the same as that illustrated in part (d) of FIG. 12.

In the example provided above, on the confirmation screen 408, a user is allowed to select between the tab selection screen and the screen at the application switching time, and an initial screen is not included in options, unlike an example explained in another exemplary embodiment. This is because it is considered that, for the web browser application, the tab selection screen matches a user's requirement more than the initial screen. Obviously, the initial screen may be included in options, in place of the tab selection screen, or three options including the initial screen may be presented.

In the example provided above, it is assumed that each of the image processing apparatus and the smartphone is an apparatus configured such that hardware that performs processing for an application and a user interface are integrated together. However, the user interface may be externally provided via a communication cable or the like or may be provided at a remote apparatus connected via a network. In such a case, a system is established in which the user interface and the remote apparatus function in conjunction with each other. In a similar manner, a printer or a scanner is not necessarily integrated with hardware which performs processing for an application. The printer or scanner may be externally provided via a communication cable or the like or may be provided at a remote place via a network.

Furthermore, in the example provided above, a user operation for an application is performed using a user interface of a touch panel type. However, the present invention is not limited to this. For example, a user operation may be input using a keyboard, a mouse, speech, or the like with reference to display on the display.

The present invention is not limited to any of the foregoing exemplary embodiments and may be achieved by various forms including combination of some or all of the foregoing exemplary embodiments and modifications.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An application apparatus comprising:
   a removal controller that performs, in a case where a removal event occurs, control for storing an operation state of an active application as an original operation state and removing the application from an operation target without terminating execution of the application, with the proviso that
   the removed application is in a state in which the application is removed from the operation target for a user under a circumstance in which the execution of the application is not terminated and the user recognizes that continuity of activation state of the application is secured;
   a selection controller that performs, before causing the removed application to be recovered as the operation target, control for allowing the user to select a specific recovery method from among a plurality of recovery methods including a method for reproducing the original operation state; and
   a recovery controller that performs, in accordance with the selected specific recovery method, control for causing an operation of the removed application to be recovered.

2. The application apparatus according to claim 1, wherein the original operation state is a state regarding display on a screen at a time when the removal event occurs.

3. The application apparatus according to claim 2, wherein the state regarding the display is a state regarding one or two or more of a hierarchical layer, a range, a character, a numerical value, and a sign of the application displayed on the screen.

4. The application apparatus according to claim 1, wherein the original operation state is a state regarding setting of an operation of the application set at a time when the removal event occurs.

5. The application apparatus according to claim 4, wherein the state regarding the setting is a state regarding a setting value set for a setting item for an operation of the application.

6. The application apparatus according to claim 1, wherein, in a case where there are a plurality of removed applications, the selection controller performs control for allowing the user to select a desired application from among the plurality of removed applications to be recovered and then allowing the user to respectively select a recovery method from among the plurality of recovery methods to be applied to the selected desired application.

7. The application apparatus according to claim 1, wherein
upon a user operation selecting the removed application for recovery,
a selection screen is displayed in a case where a setting value of the application has been changed when the removal event occurred, and
the selection screen is not displayed in a case where only a display state of the application has been changed when the removal event occurred.

8. The application apparatus according to claim 1, wherein in a case where a user operation selecting the removed application for recovery is determined to be a selection-type recovery event, the selection controller performs control for allowing the user to select the specific recovery method from among the plurality of recovery methods.

9. The application apparatus according to claim 1, wherein
upon a user operation selecting the removed application for recovery, when the removal event for the application satisfies a predetermined option presentation condition, the selection controller performs control for allowing the user to select the specific recovery method from among the plurality of recovery methods.

10. The application apparatus according to claim 1, wherein
upon a user operation selecting the removed application for recovery, when an operation state at a stage in which the application is removed satisfies a predetermined option presentation condition, the selection controller performs control for allowing the user to select the specific recovery method from among the plurality of recovery methods.

11. The application apparatus according to claim 1, wherein in a case where the removal event occurs in a process in which a lower-level application is called from a higher-level application and executed, the removal controller stores an operation state in which the lower-level application is called from the higher-level application as the original operation state, and
wherein before causing the removed higher-level application to be recovered, the selection controller performs control for allowing the user to select the specific recovery method from among the plurality of recovery methods including the method for reproducing the original operation state.

12. The application apparatus according to claim 1, wherein the removal event includes the user instructing a switch of display for switching a window of the application to a different display.

13. The application apparatus according to claim 12, wherein the removal event includes the user pressing a home button while the window of the application is displayed.

14. The application apparatus according to claim 13, wherein
upon the user pressing the home button while the window of the application is displayed, the application is removed and a home screen is displayed, and
upon a user operation selecting the removed application for recovery from the home screen,
in a case where the user operation is determined to be a first type, the selection controller performs control for allowing the user to select the specific recovery method from among the plurality of recovery methods, and
in a case where the user operation is determined to be a second type, the removed application is automatically recovered without allowing the user to select the specific recovery method.

15. An image processing apparatus comprising:
an image processing unit that includes at least one of a scanner which generates image data and a printer which performs printing based on the image data;
an application that is started to control the image processing unit;
a removal controller that performs, in a case where a removal event occurs, control for storing an operation state of an active application as an original operation state and removing the application from an operation target without terminating execution of the application, with the proviso that
the removed application is in a state in which the application is removed from the operation target for a user under a circumstance in which the execution of the application is not terminated and the user recognizes that continuity of activation state of the application is secured;
a selection controller that performs, before causing the removed application to be recovered as the operation target, control for allowing a user to select a specific recovery method from among a plurality of recovery methods including a method for reproducing the original operation state; and
a recovery controller that performs, in accordance with the selected specific recovery method, control for causing an operation of the removed application to be recovered,
wherein the image processing unit is controlled based on an operation state of the application.

16. A non-transitory computer readable medium storing a program causing a computer to execute a process for an application, the process comprising:
performing, in a case where a removal event occurs, control for storing an operation state of an active application as an original operation state and removing the application from an operation target without terminating execution of the application, with the proviso that
the removed application is in a state in which the application is removed from the operation target for a user under a circumstance in which the execution of the application is not terminated and the user recognizes that continuity of activation state of the application is secured;
performing, before causing the removed application to be recovered as the operation target, control for allowing a user to select a specific recovery method from among a plurality of recovery methods including a method for reproducing the original operation state; and
performing, in accordance with the selected specific recovery method, control for causing an operation of the removed application to be recovered.

* * * * *